Patented Oct. 31, 1950

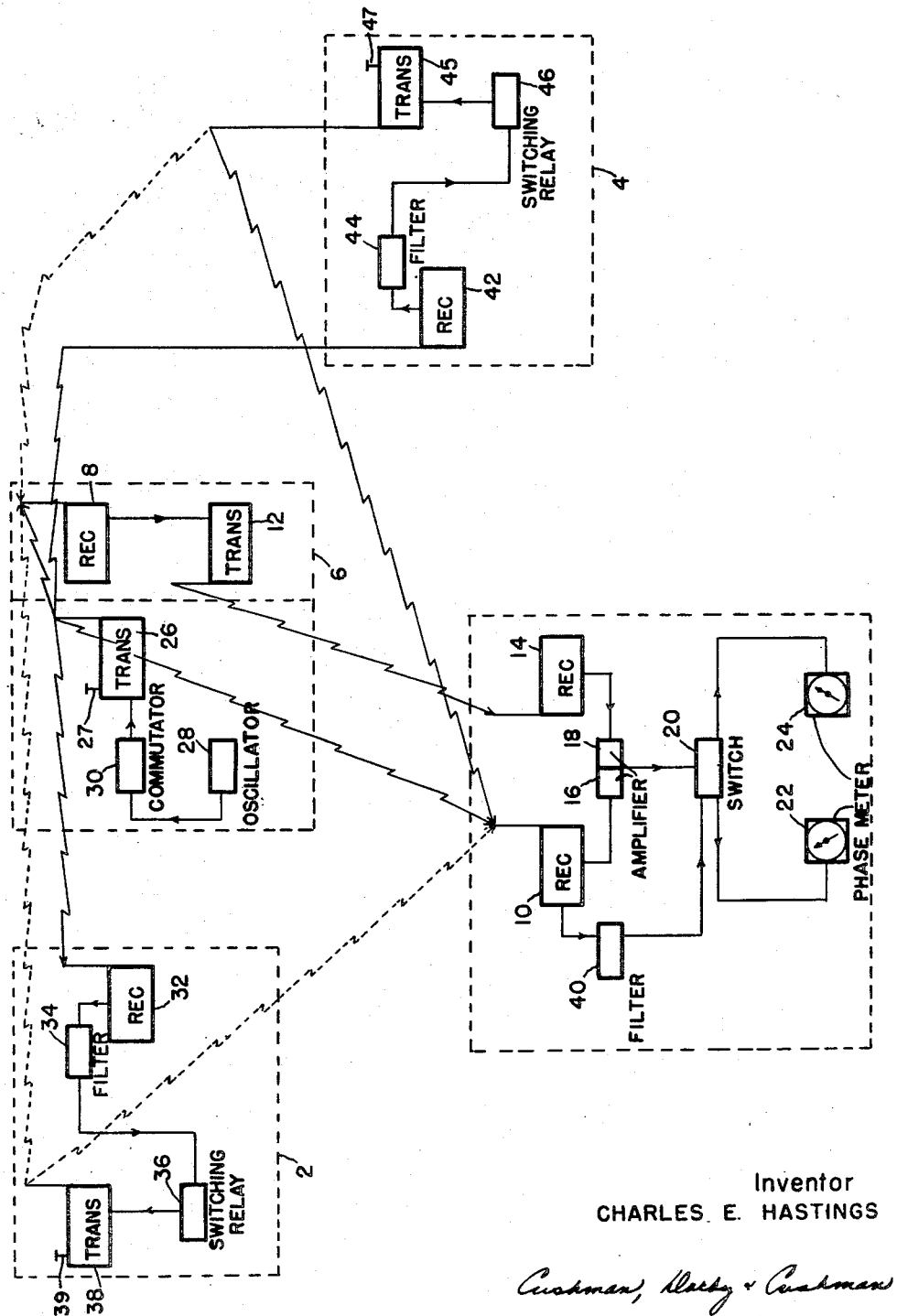

2,528,140

UNITED STATES PATENT OFFICE 2,528,140

NAVIGATIONAL AID

Charles E. Hastings, Hampton, Va., assignor to Hastings Instrument Company, Inc., Hampton, Va., a corporation of Virginia Application June 8, 1948, Serial No. 31,681

9 Claims. (Cl. 343—105)

This invention relates to navigational equipment employing means for indicating phase difference between the beat frequencies of two pairs of transmitters.

The need for navigational equipment of sufficient accuracy to determine a position within a few inches has recently become acute. The equipment that is the subject of this invention operates by measuring and indicating the phase difference between the beat frequencies of two pairs of transmitters as they are received at a fixed point and at the object being navigated. Each pair of fixed transmitters form the focal points of two separate systems of hyperbolas, and measurements of phase with respect to each pair of transmitters determines the hyperbolic line of position. The intersection of these hyperbolic lines determines the position of the navigated object.

The principal object of this invention is to provide a means for operating the navigational equipment of the invention on a minimum number of assigned frequency channels.

Another object is to provide a constant output amplifier for equalizing the voltages before they are fed to the phase indicator in order that accurate determination of position can be made.

Referring to the drawing:

Figure 1 is a block diagram illustrating a navigation system employing two families of hyperbolas.

Basically, the navigational system of this invention comprises two fixed relay stations 2 and 4 and a common reference station 6 located at predetermined positions which may be fixed or not as the occasion demands. A receiver 8 capable of receiving the transmissions of the transmitters of said stations and detecting the beat frequency therebetween is located at a fixed position and a similar receiver 10 is located on the object being navigated. The output of the receiver 8 is relayed by means of transmitter 12 operating on a unique frequency to a receiver 14 and the outputs of the reecivers 10 and 14 are fed to equalizing constant output amplifiers 16 and 18. From there, the signals are fed by means of a switch 20 to phase indicator 22 or phase indicator 24 depending on the position of the switch.

The stations 2 and 6 are the focal points for one family of hyperbolas and stations 4 and 6 are the focal points for an intersecting family of hyperbolas. Thus, if the hyperbolic line of position can be determined with respect to each family, respectively, the intersection of these hyperbolas is the position of the moving object.

In order that the number of radio frequency channels be reduced to a minimum, the following means is provided for operating transmitters 2 and 4 alternately, thus making it possible for receivers 8 and 10 to reecive the transmissions of all three transmitters. This is accomplished by intermittently modulating the reference transmitter 26 located at station 6 by means of a tone oscillator 28 and a commutator 30. A receiver 32 at station 2 detects the modulation energy, which after being passed through band pass filter 34 is applied to the normally open switching relay 36 so as to close it and furnish energy to transmitter 38. Receiver 10 on the moving object detects the same modulation and after it has passed through filter 40, the energy so derived operates the switching relay 20 so as to connect the output of the constant output amplifiers to phase indicator 22. The reading of phase indicator 22 indicates the position of the moving object with respect to two unidentified hyperbolic lines having focal points at stations 2 and 6. The presence of the modulation in the output of transmitter 26 is also detected by a reeciver 42 located at station 4 and its output after passing through the band pass filter 44, energizes switching relay 46 which, in its unenergized position, maintains transmitter 45 in operation. Thus, the presence of modulation in the output of transmitter 26 maintains transmitter 38 in operation and switch 20 in such a position as to hook the output of the constant output amplifiers to phase indicator 22, and in the absence of such modulation, transmitter 45 is energized and the output of the amplifiers 16 and 18 are fed by switch 20 to phase indicator 24. Phase indicator 24 determines the position between two unidentified hyperbolic lines having focal points at station 6 and station 4. If the alternation is at a sufficiently high rate, the phase indicators 22 and 24 give continuous readings.

The frequencies of the three transmitters are all in the same channel and if the wave length of the carriers is long with respect to the distance between the stations 2 and 6 and 4 and 6, the readings of phase indicators 22 and 24 give a fix on the position. However, if it is desired to determine the position with a high degree of accuracy, it is necessary that the wave lengths of the carrier frequencies of the three transmitters be short in comparison with the distances between the stations. In this event, the zero position of the phase indicators corresponds to families of imaginary hyperbolic lines. That is, as the object passes from one hyperbolic line to the other, the phase indicator undergoes one revolution.

Thus, unless the object is started at a known lane and the changes in phase are integrated, it is impossible to tell the lane of position, a lane being a space between two of the hyperbolic lines. Therefore, a lane identification system is provided, the details of which are discussed below.

*Operation*

Assuming that transmitters 38 and 26 are energized at slightly different frequencies, the beat frequency between the emissions thereof, no matter where detected, is always the same. However, due to the difference in distances between the transmitters and the receivers 8 and 10, the phase of the beat frequency as received at said receivers is not the same. By relaying the beat frequency as detected at receiver 8 to receiver 14 and there comparing its phase with the phase of the beat frequency detected at receiver 10, the locus with respect to one family of hyperbolas can be determined. If the difference in the distances between receiver 10 and the transmitters 38 and 26 remains constant, the phase of the beat frequency signal as received at receiver 10 remains unchanged. Similarly, the transmitter 45 is energized at a frequency slightly different from that of transmitter 26, so that the beat frequency between the emissions thereof as detected at receivers 8 and 10 varies in phase. By relaying the beat frequency between the transmitted signals of transmitters 45 and 26 as detected by receiver 8 to receiver 14, and there comparing its phase with the phase of the beat frequency detected at receiver 10, the locus relative to a second family of hyperbolas can be determined. By plotting the two hyperbolic loci so obtained and finding their point of intersection, an accurate fix on the position of the mobile equipment and the object being navigated is obtained.

If it were not for the system of operating the transmitters 45 and 38 alternately, it would be necessary to have duplicate channels in order to get information with respect to separate hyperbolic families.

In order to determine the lane without the necessity of integrating the changes in the phase indicator, it is necessary to alter the frequencies of the transmitters by known amounts so that the changes in phase as indicated at indicators 22 and 24 are predetermined for a given hyperbolic locus. The theory of this is that if either or both of the heterodyned transmitters are changed in frequency, the phase between the beats as received at receiver 8 and receiver 10 is altered by a predetermined amount which is for a given frequency change, greater in the vicinities of the stations 2, 4 and 6. That is to say, since the phase angle indicated at any particular position is dependent upon the frequencies of the transmitter pair concerned, it is obvious that a change in the transmitted frequencies produces a change in the phase indication. Inasmuch as the phase indicator reading depends upon both the frequency and the difference in distances between the moving object and the two transmitters which are the focal points of the hyperbolic system, it can be seen that for a given change in frequency, the phase indication changes a greater amount where the difference in the distances is the greatest, and correspondingly decreasing amounts as the distances approach equality. In other words, if the navigated object were located on one of the imaginary hyperbolic lines and the frequencies of the transmitters is changed, a change in the phase indicator reading of a number of degrees takes place, and if the navigated object is located at the adjacent hyperbolic line, the change in the phase indicator reading accompanying the change in transmitted frequencies is greater or less depending upon whether that second hyperbolic line is closer to one of the stations or to the midpoint between them. Although the change in the phase indications that can be produced by manipulating the transmitted frequencies within a single channel is slight, it is possible to distinguish between the larger change at one hyperbolic line and the smaller change at the second hyperbolic line and, therefore, determine that one's position is between the two hyperbolic lines. By noticing the direction of the phase change, it is possible to determine on which side of the center line between the stations one is. This operation can be carried out with respect to each family of hyperbola and, therefore, the intersecting hyperbolic loci determines one's position.

A convenient method of changing the frequencies of the transmitters is to operate them at the high frequency end of the channel and change them to the low frequency of the channel, keeping the difference in frequency constant. The transmitter frequencies may obviously be manually changed by an operator, at predetermined times or on signal, by means of conventional knobs 39, 27 and 47 of transmitters 38, 26 and 45, respectively, or conventional remote control means may be provided to change the transmitter frequencies.

Another method of operation is to change one of the transmitters, 38, for example, from an audio note above transmitter 26 to an audio note below transmitter 26.

It is thought that the above description of methods for eliminating unnecessary radio frequency channels by alternately energizing transmitter 38 and transmitter 45 and of securing accuracy by use of constant output amplifiers, is a distinct step forward in the art of navigation.

I claim:

1. A two dimensional navigation system comprising a first transmitter, a second transmitter and a reference transmitter, means for alternately operating said first and second transmitters, means for comparing the phase of the beats between said reference transmitter and said first transmitter as received at a first point with respect to the phase of the beats between the same transmitters as received at a second point, and a means for comparing the phases of the beats between the reference transmitter and said second transmitter as received at said first point with respect to the phase of the beats between the same transmitters as received at a second point.

2. A two dimensional navigation system comprising a first transmitter operated at a given carrier frequency, a normally energized second transmitter operated at a different carrier frequency and a normally de-energized third transmitter operated at the same carrier frequency as said second transmitter, a source of modulation frequency, means for alternately applying the output of said source so as to modulate the carrier of said first transmitter, means for de-energizing said second transmitter in response to the modulation, means to energize said third transmitter in response to the modulation, a receiver tuned to receive the output of said transmitters, a fourth transmitter operated at a carrier frequency different from said transmitters, means for applying the output of said receiver so as to modulate said fourth transmitter, a mobile station that is to be navigated comprising a first receiver tuned to receive the output of said fourth transmitter, a second receiver tuned to receive the output of said first, second, and third transmitters, a first phase meter, a second phase meter, means for equalizing the outputs of said first and second receivers, means for applying the outputs of said first and second receivers to said first phase meter in response to modulations received from said first transmitter, said means causing the output of said first and second receivers to be applied to said second phase meter when said first transmitter is not being modulated.

3. A lane identification system comprising a first transmitter and a second transmitter, each of said transmitters being tuned to operate at a different frequency, a first means for receiving and detecting the beat frequency between the emissions from said first and second transmitters, a second means for receiving and detecting the beat frequency between the emissions from said first and second transmitters, said second means being spaced from said first means, means for indicating the phase difference between said detected beat frequencies, and means for altering the frequency of said transmitters.

4. A lane identification system such as described in claim 3 in which the frequencies of the first and second transmitter is interchanged.

5. A lane identification system such as described in claim 3 in which the frequency of one transmitter is changed from an audio frequency difference above the other transmitter to an audio frequency difference below said other transmitter.

6. A lane identification system such as described in claim 3 in which the frequency of one transmitter is changed from an audio frequency below to an audio frequency above said one transmitter.

7. A lane identification system such as described in claim 3 in which the frequency of both the first and second transmitters is changed an equal amount.

8. A navigation system comprising a first transmitter, a second transmitter and a reference transmitter, means for operating said first and second transmitters alternately, two spaced receivers adapted to detect the beat frequency between the emissions of said reference transmitter and the operating one of said first and second transmitters, means for relaying the signal detected by one of said receivers to the vicinity of the other of said receivers, duplicate means in the vicinity of the other of said receivers adapted to indicate the phase difference between said detected beat frequency signals, and means for switching said detected signals alternately to said indicating means in synchronism with the operation of said first and second transmitters.

9. A navigation system comprising a first transmitter, a second transmitter and reference transmitter, means for operating said first and second transmitters alternately, two spaced receivers adapted to detect the beat frequency between the emissions of said reference transmitter and the operating one of said first and second transmitters, means for relaying the signals detected by said receivers to a common point, two phase meters at said common point adapted to indicate the phase difference between said detected beat frequency signals, and means for switching said detected signals alternately to said phase meters in synchronism with the operation of said first and second transmitters.

CHARLES E. HASTINGS.

REFERENCES CITED

The following references are of record in the file of this patent:

UNITED STATES PATENTS

| Number | Name | Date |
| --- | --- | --- |
| 2,148,267 | Honore | Feb. 21, 1939 |
| 2,328,944 | Beatty | Sept. 7, 1943 |
| 2,379,362 | Lear | June 26, 1945 |
| 2,433,381 | Marchand | Dec. 30, 1947 |
| 2,440,755 | O'Brien | May 4, 1948 |
| 2,451,823 | Guanella | Oct. 19, 1948 |
| 2,483,558 | O'Brien | Oct. 4, 1949 |